July 11, 1950

C. L. GARRISON 2,514,541

FLIGHT INDICATOR

Filed July 13, 1946

INVENTOR.
CHARLES L. GARRISON.
BY
Lockwood, Goldsmith & Galt.
ATTORNEYS.

July 11, 1950

C. L. GARRISON 2,514,541

FLIGHT INDICATOR

Filed July 13, 1946

INVENTOR.
CHARLES L. GARRISON,
BY Lockwood, Goldsmith & Galt
ATTORNEYS.

Patented July 11, 1950

2,514,541

UNITED STATES PATENT OFFICE 2,514,541

FLIGHT INDICATOR

Charles L. Garrison, Marion, Ind.

Application July 13, 1946, Serial No. 683,297

5 Claims. (Cl. 88—24)

This invention relates to a flight indicator device.

The chief object of this invention is to provide the pilot with a map representation and have imposed thereon a movable indicator for substantially indicating the vehicle line of flight (if an airplane) and the substantially coincident position of the vehicle with respect to the ground on said map reproduction.

One feature of the invention resides in the compact arrangement and light-weight construction of the indicating device and also its wide range of application through a minimum of material.

Another feature of the invention resides in the adjustment of the line of flight indicator, the shadow of which is impressed upon a transluscent field having formed thereon a legend, so that the actual travel of the indicator with relation to the map representation corresponds to the actual line of flight of the vehicle and, further, that the indicator is movable substantially proportionally to the vehicle speed with reference to the ground speed if the device be applied to an airplane.

A further feature of the invention resides in the means for returning the vehicle indicator to initial position when it has reached the maximum of its permissible travel or has reached a position corresponding to the terminus of the flight.

Still a further feature of the invention resides in the means for advancing or retracting the map means, the representation of which is imposed upon the translucent field.

A further feature of the invention resides in a variable speed reducer whereby the estimated ground speed of a plane can be imposed upon the flight indicator, the power for the movement thereof being derived from the movement of the plane.

Other objects and features of the invention will be set forth more fully hereinafter.

The full nature of the invention will be understood from the accompanying drawings and the following description and claims.

In the drawings:

Fig. 5 is a plan view of a drive for moving the map representation.

Figure 1:
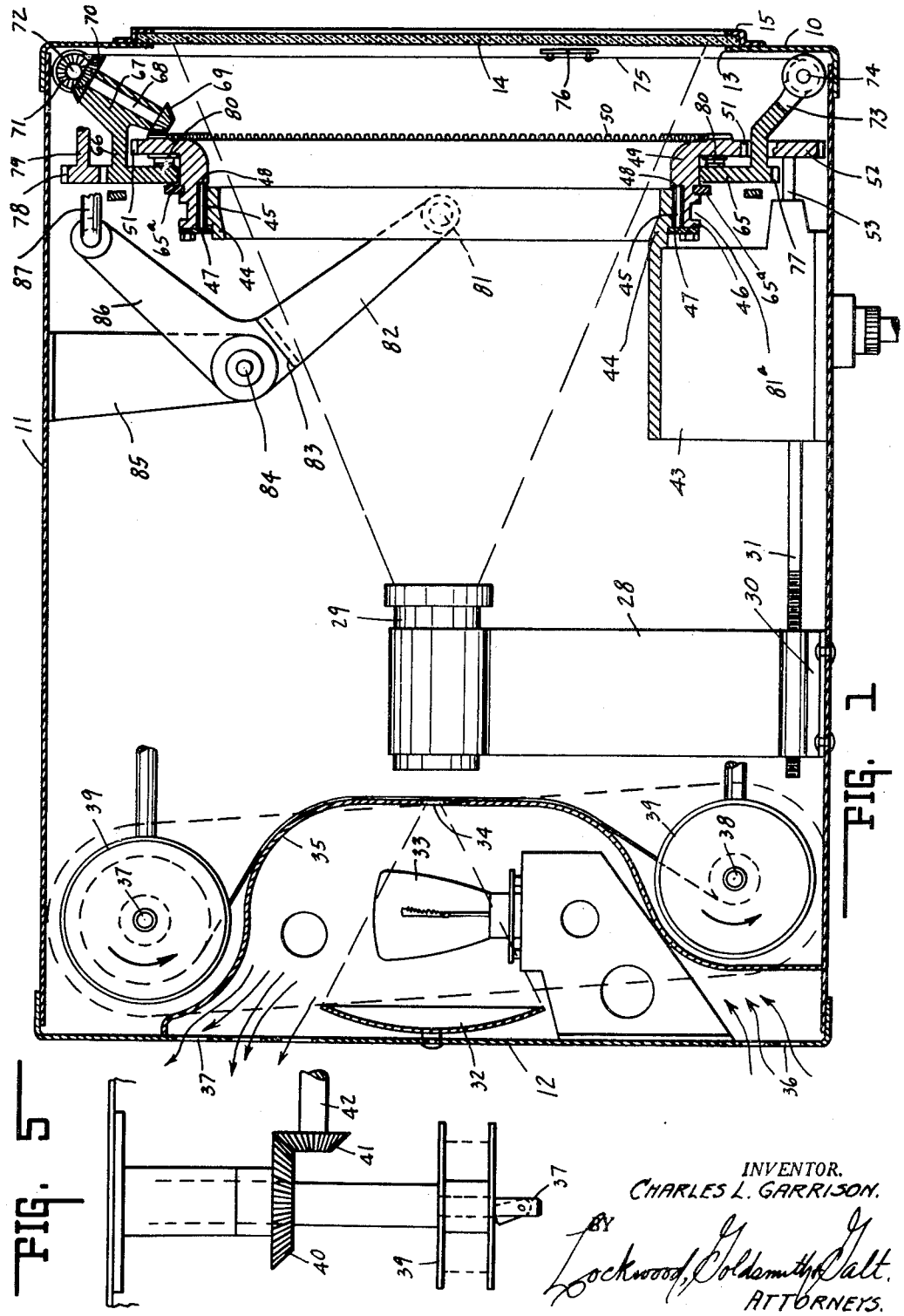
Fig. 1 is a longitudinal, central sectional view of the indicating device, the forward face control elements being omitted therefrom, certain of the parts being shown in elevation, such as the lens system of the reproducing device.
Figure 2:
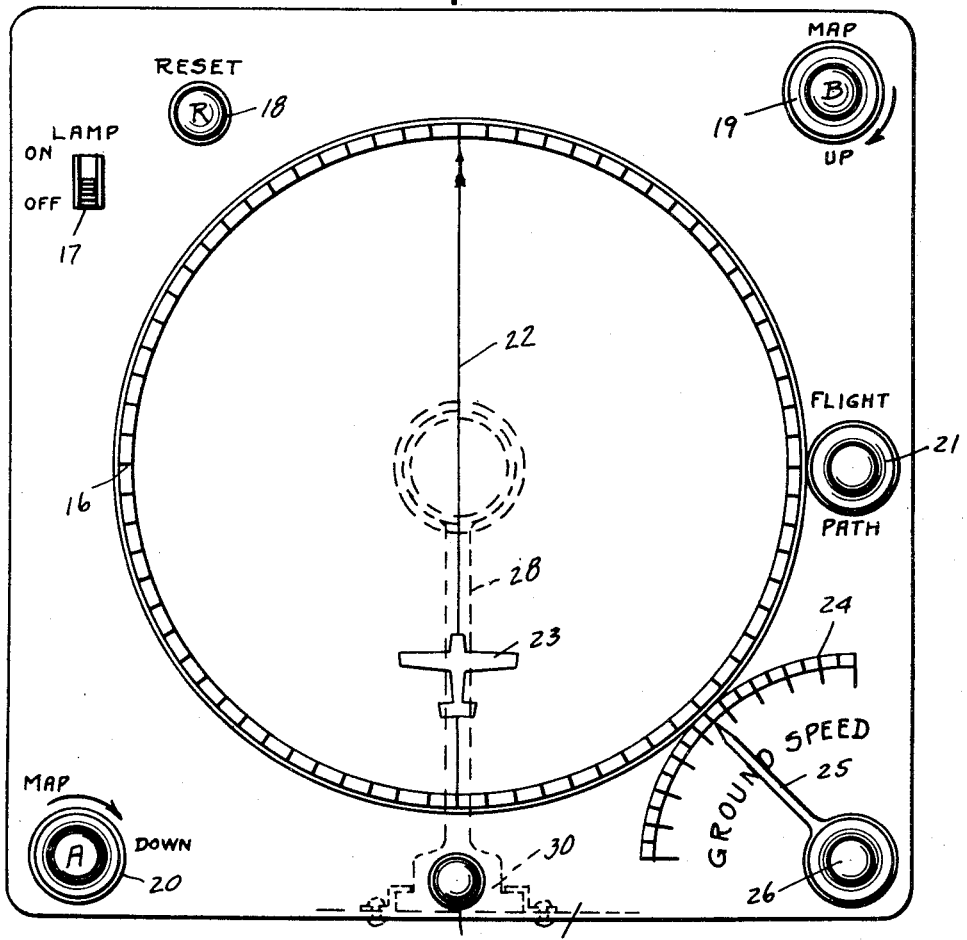
Fig. 2 is a front elevation of the front of the device.
Figure 4:
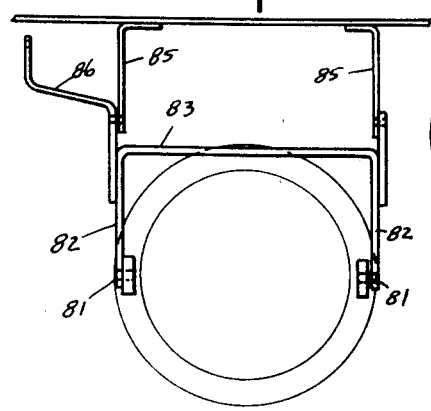
Fig. 4 is an elevational view of the clutch control device for resetting purposes.

In Figs. 1 and 2 of the drawings 10 indicates a front cover for a container, see Fig. 1, indicated by the numeral 11, and preferably rigid therewith, the resulting container being closed as by the back 12. The front includes the aperture 13 and the same is circular and mounts a translucent medium, such as a ground glass disk 14, retained by the flange 15. This flange is preferably legended with a scale representation 16, see Fig. 1.

Mounted on, or rather exposed by, the front 10 is the actuating member 17 of an on and off switch, to which reference will be had. Also exposed by the front is a reset member 18. Also mounted on the front are certain manually operable members, such as 19 and 20, to which further reference will be had.

A control 21 is exposed by the front and is arranged to shift rotatably the line of flight indicator which produces the representation 22 on the ground glass screen, the indicator itself producing the representation 23 on said screen.

Adjacent the annular scale is an arcuate scale 24 and associated therewith is a finger indicator 25 carried by shaft 26, which is associated with a speed change device. The front 10 also mounts a focusing adjustment member 27.

Referring to Fig. 1, it will be observed that there is substantially mounted upon the bottom of the casing 11 the standard 28 and in it there is slidably mounted a lens system 29. Suitable mechanism 30 is operatively associated with the lens system 29 and the rod 31 that terminates in the exposed focusing control 27. As this control is rotated in one direction or the other, the lens system is advanced or retracted relative to the screen 14.

Rearwardly of this lens system and carried by the back 12 is a reflector 32 and positioned forwardly thereof is a light bulb 33 of proper candle power and preferably of low voltage type. It is controlled by a switch, not shown, the exposed portion 17 of which can be moved to the on and off position. When on, the lamp bulb is energized and light is directed forwardly and is reflected forwardly through an aperture 34 in an auxiliary housing portion 35 carried by the back 12. The back 12 is apertured as at 36 and 37 for heat dissipation purposes.

Rotatably supported above and below the auxiliary housing 35 are two parallel shafts 37 and 38. These shafts mount spools 39, see Fig. 5, and secured thereto is a transparent ribbon or film upon which has been formed a map representation. This can be of very small size and when light is passed therethrough and the lens system is properly focused, the small transparent portion exposed by aperture 34 is projected to substantially occupy the entire screen 14 and form thereon a map representation. Each of the shafts 37 mounts a bevel gear 40 meshing with a bevel gear 41 and rigid therewith is the shaft 42. The upper right-hand shaft projects through the front 10 and terminates in the knob 19 aforesaid. The lower left-hand shaft 42 projects through the front cover 10 and terminates in the knob 20.

When the knob 19 is rotated clockwise the transparency is wound upon the upper spool 39 and when the lower knob 20 is rotated clockwise the transparency is wound upon the lower spool. In other words, the map transparency is brought down with respect to the aperture 34.

Suitably secured to the bottom of the housing is a standard or support structure 43 and the latter supports a tubular element 44. Exteriorly thereof is a series of anti-friction rollers 45 which rotatably support the tubular element 46, the rollers being retained by any suitable means as indicated at 47 and by the shouldered portion 48. The tubular member 46 is extended forwardly and outwardly as at 49 and on its forward face includes the teeth 50. Upon its periphery there are provided the teeth 51.

Meshing with the teeth 51 is the pinion 52 carried by the shaft 53. This shaft 53 terminates in a bevel pinion 54, see Fig. 3, meshing with a bevel gear 55 carried by a shaft 56 which in turn mounts a friction plate 57. Juxtapositioned to the plate and movable axially thereof is the shaft 58 which mounts the friction driving wheel 59. A channel collar 60 is carried by said shaft and a yoke shifting lever 61 pivoted at 62 is connected to a rod 63. This rod 63 is operatively connected to the shaft 26 by means not shown, so that the driving wheel 59 can be shifted axially of the disk 57 for changing the speed ratio.

An air speed device, such as a small propeller operating through a reduction gear structure, drives a flexible shaft (all not shown) that has connection with the shaft 58 at 64. Thus, while the plane is in flight the shaft 53 will be constantly rotated at a speed proportional to the air speed.

Figure 3:
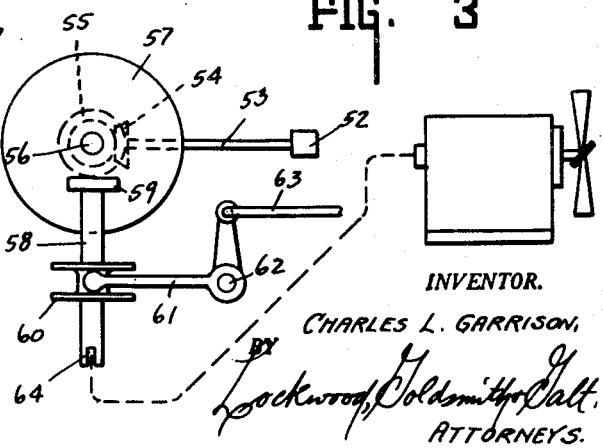
Fig. 3 is a schematic plan view of the variable speed control.

Knowing the approximate ground speed with relation to the air speed, the pilot can readily shift speed indicator 25 to the proper ground speed, which will shift the variable speed device shown in Fig. 3 to the proper ratio so that there will be the proper driving speed imparted to the ring element 49 directly proportional to the ground speed of the vehicle.

Adjacent the member 46 and rotatable relative thereto is a disk 65. This disk 65 is retained by means of a snap or lock ring 65a and includes a forward cylindrical projection 66. The latter at one point terminates in a forward and outwardly directed bracket 67 in which is rotatably supported a shaft 68. The lower inner end of this shaft mounts a bevel gear 69 in constant mesh with the peripheral or ring arranged teeth 50. The upper or outer end of the shaft 68 mounts the bevel gear 70 meshing with bevel pinion 71 carried by shaft 72.

Opposite this bracket 67 is another bracket 73 which rotatably supports a shaft 74 parallel to shaft 72. A wire 75 is secured at one end to shaft 72 and at its opposite end to shaft 74. A coil spring, not shown, serves as a re-wind spring and serves to maintain the wire taut and serves to return the wire to the wound condition on shaft 74 whenever the power is disassociated from the winding shaft 72.

It will be understood that as shaft 64 is rotated, the wire 75 is moved from the shaft 74 to the shaft 72 and wound thereon. This wire carries the indicator 76 and the wire 75 and indicator 76 form the image 22 and 23 previously mentioned and illustrated in Fig. 2.

Plate 64 upon its periphery includes teeth 77 and meshing therewith is a pinion 78 carried by the shaft 79, the latter terminating in the flight path indicator control knob 21 on the front of the device.

As the flight path indicator knob 21 is rotated, the entire mechanism aforesaid, including the wire 71 and the indicator 76, is rotated so that the line of flight, or rather the representation thereof, will be properly coordinated with the map representation upon the translucent screen or ground glass or frosted plate 14.

Interposed between the portion 49 and the plate 64 is a plurality of arcuately spaced springs 80. These springs 80 normally maintain the teeth 50 in mesh with the bevel pinion 69.

Pivoted to the portion 46 as at 81 are the arms 82, in turn connected as at 83 and pivotally supported at 84 upon the brackets 85. Also rigid with this structure is the single arm 86, to which is connected the rod 87, the latter terminating in the reset member 18 aforementioned exposed upon the front 10 of the device. When this reset mechanism is pulled outwardly the member 46 is retracted toward the lens system, compressing the springs 80 in so doing. As soon as the teeth 50 are disengaged from the pinion 69 the wire indicator 71 is unwound from the shaft 72 and correspondingly wound upon the shaft 74 by the rewind spring. This returns the indicator 76 to its lowermost, starting or initial position. When the reset mechanism is released the springs 80 become effective and return the parts to the operative connection and position and teeth 50 re-engage pinion 69 so that the wire 71 will again be wound upon shaft 72 and the flight indicator 76 will move from its initial position along the line of flight determined by the wire.

Upon this being effected, the lower left-hand knob 20 is turned to position a new portion of the map in registration with the aperture 34 so that the flight indicator shadow will travel across the new map representation and continue to disclose the continuation of the flight of the plane.

As previously stated, if the actual line of flight does not correspond with the actual longitude the flight path knob 21 is actuated so that the desired departure from the longitude is effected.

As previously set forth, the average speed of the vehicle, such as a plane with reference to the ground, is a combination of the normal speed plus or minus a tail wind or head wind respectively, or the travel direction component thereof if a cross-wind, so that when the pilot calculates his actual ground speed and adjusts indicator 25 thereto, this effects the necessary proportional travel of the indicator 76 to insure proper travel of the legend 23 across the map representation.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A vehicle flight path indicating device including in combination a rotatably mounted tubular support, a translucent field aligned therewith, a vehicle indicator therebetween, means for moving the indicator across the support, said means and indicator being supported by the support, said means moving the indicator in accordance with vehicle travel, means providing a map legend, means simultaneously projecting that legend and the indicator upon the said field, and means for rotatably adjusting the tubular support so that the line of flight and the map legend representation on the screen corresponds to true directional travel of the vehicle.

2. A device as defined by claim 1 characterized by the addition of a clutch releasable when the indicator has completed its traverse across the support, and means automatically returning the indicator to initial position upon clutch release.

3. A device as defined by claim 1 characterized by the addition of means for moving the map legend providing means, when the flight indicator has traversed the tubularity, to continue the flight indication, for reproduction on the translucent field the extension of the map legend.

4. A device as defined by claim 1 characterized by the addition of means for moving the map legend providing means, when the flight indicator has traversed the tubularity, to continue the flight indication, for reproduction on the translucent field the extension of the map legend, said last mentioned moving means being reversible.

5. A device as defined by claim 1 characterized by the indicator moving means including a variable speed reducer for insuring accurate proportional indicator speed to vehicle ground speed.

CHARLES L. GARRISON.

REFERENCES CITED

The following references are of record in the file of this patent:

UNITED STATES PATENTS

| Number | Name | Date |
| --- | --- | --- |
| 1,745,933 | Kauch et al. | Feb. 4, 1930 |
| 1,980,886 | Talafre et al. | Nov. 13, 1934 |
| 2,267,649 | Graves | Dec. 23, 1941 |
| 2,271,296 | Hargrave et al. | Jan. 27, 1942 |
| 2,296,928 | Briechle et al. | Sept. 29, 1942 |
| 2,314,497 | Hargrave et al. | Mar. 23, 1943 |
| 2,376,445 | Morely et al. | May 22, 1945 |
| 2,381,634 | Back | Aug. 7, 1945 |